United States Patent

[11] 3,631,257

| [72] | Inventors | Byron C. Behr<br>Stamford;<br>Richard Head, White Plains, both of Conn.;<br>Frederick Soskel, Peekskill, N.Y. |
|---|---|---|
| [21] | Appl. No. | 42,033 |
| [22] | Filed | June 1, 1970 |
| [45] | Patented | Dec. 28, 1971 |
| [73] | Assignee | Union Carbide Corporation<br>New York, N.Y. |

[54] AUTOMATIC POWER SWITCHING UNIT
10 Claims, 1 Drawing Fig.

[52] U.S. Cl. .................................................. 307/66, 307/130
[51] Int. Cl. ................................................. H02j 9/06
[50] Field of Search .................................... 307/66, 64, 65, 23, 130

[56] References Cited
UNITED STATES PATENTS

| 2,992,363 | 7/1961 | Granquist ................. | 307/66 UX |
| 3,339,081 | 8/1967 | Borden et al. ............. | 307/66 |
| 3,390,307 | 6/1968 | Paddison et al. .......... | 307/66 X |
| 3,440,435 | 4/1969 | Sanders ..................... | 307/66 |
| 3,049,623 | 8/1962 | Durall ........................ | 307/66 |
| 3,255,398 | 6/1966 | Bagno ........................ | 307/66 X |
| 3,293,444 | 12/1966 | Hagopian .................. | 307/66 |
| 3,293,530 | 12/1966 | Baude ........................ | 307/66 X |
| 3,308,306 | 3/1967 | Bagno ........................ | 307/66 |
| 3,337,743 | 8/1967 | Rolfes ........................ | 307/66 |
| 3,344,282 | 9/1967 | Baude ........................ | 307/66 |

*Primary Examiner*—Robert K. Schaefer
*Assistant Examiner*—William J. Smith
*Attorneys*—Paul A. Rose, Robert C. Cummings, John S. Piscitello and Cornelius F. O'Brien

ABSTRACT: A switching unit for automatically switching a load from a working power supply to a standby power supply when the voltage of the working supply decreases to a predetermined level and then to automatically switch the load back to the working supply when and if it increases above the predetermined level.

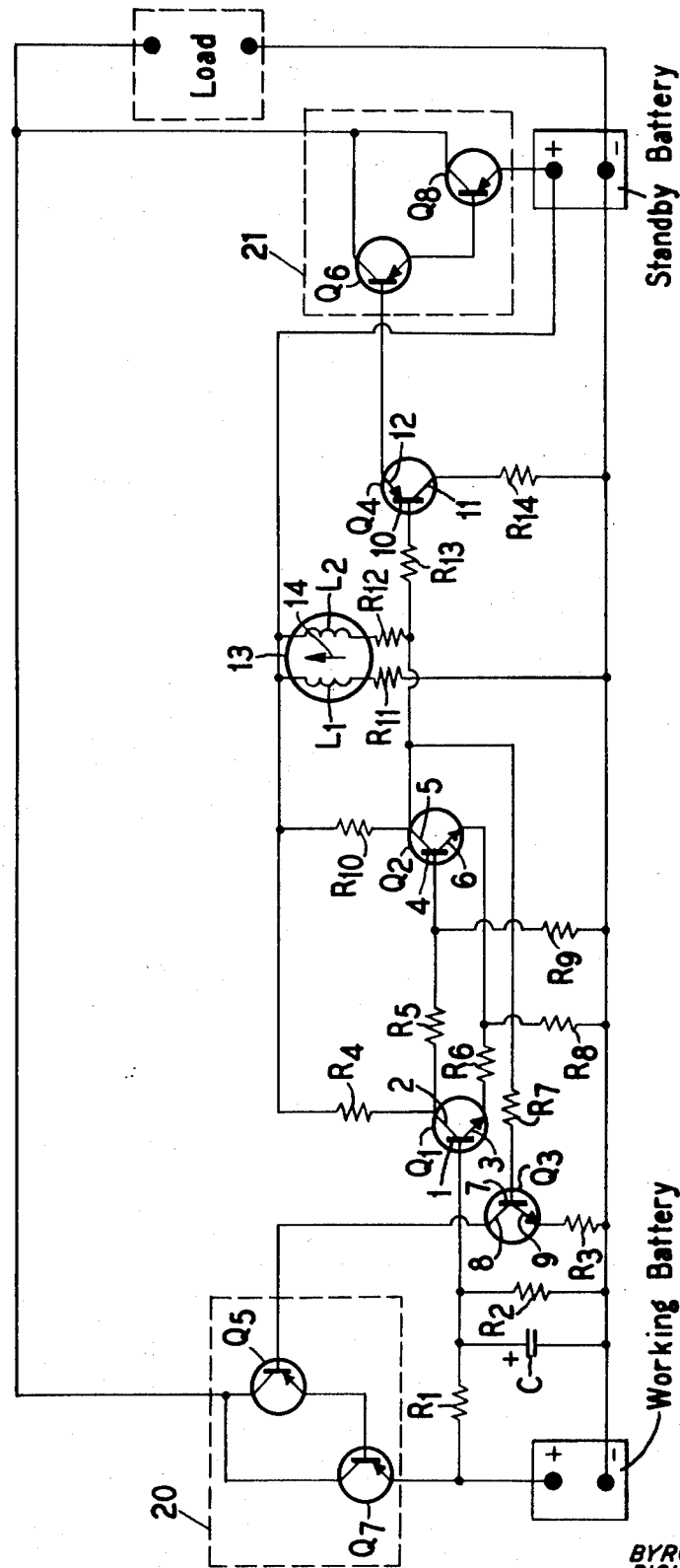

AUTOMATIC POWER SWITCHING UNIT

FIELD OF THE INVENTION

This invention relates to a switching device for use in automatically switching a load from a working power supply to a standby power supply when the voltage value of the working power supply decreases to a predetermined level and then to automatically switch the load back to the original working power supply when and if its voltage value increases about a second predetermined level.

DESCRIPTION OF PRIOR ART

Battery-operated signal and/or lighting devices are used by industry in a variety of applications. For example, the railroad industry employs a large number of air cell batteries in railway signal applications while in the maritime industry the air cell batteries are used to light navigational buoys strategically positioned along rivers and inland bodies of water. The necessity of maintaining these battery-operated devices in operative condition requires periodic checks and replacement of the battery power supply. Since batteries have a variable cell life during use, the exact time at which they should be removed from service presents a problem to industry.

Due to the increased cost of personnel, it is sometimes economically justifiable to have the individual replace a battery still possessing usable potential energy rather than have him make an additional trip, at a latter date, for that purpose. Where this personnel cost is not the determining factor, a proper check of a working battery involves a hydrometer test of the specific gravity of the electrolyte of the battery. This test provides a reasonable measurement of the remaining life in a battery. The cost of checking the batteries under operating conditions and/or the replacement of usable batteries or batteries that regenerate using energy when disconnected from a load increases the overall cost of operating battery powered devices which are employed at remote localities not easily accessible by personnel. In addition, the interval period between checking and/or replacing the batteries in an operating system has to be relatively short in order to avoid complete energy dissipation in a battery cell which could inactivate the system thereby causing possible dire consequences. The maintenance of a battery-powered system that is to be relatively free from interruption due to short-life batteries or the like requires short periodic checks of the system, the extent of which is a function of time and money.

In a copending patent application, U.S. Ser. No. 806,215 a fail-safe-type battery-operated system is described which comprises a solid-state switching circuit for use in switching off a working battery and switching on a standby battery when the potential energy level in the working battery falls below a predetermined level. This switching system is very effective in low-voltage battery applications and greatly minimizes the possibility of having a battery-powered device become inactivated due to battery malfunctioning since a standby battery is always ready to automatically take over and supply the necessary energy to a load in such circumstances. However, since the solid-state circuit is designed for very low-voltage applications, (1-2 volts), it can not function electrically in a higher voltage battery-powered system. Therefore the high maintenance cost of operating a relatively fail-safe higher voltage battery-powered system still plagues industry.

It is the object of this invention, to provide a solid-state, high-voltage switching circuit which can be used to automatically switch a load from a power depleted source to a fully powered standby source and then to switch the load back to the former source when and if it increases to a predetermined working voltage level. When this device is used in battery-powered applications, the energy stored in a working battery can be fully consumed due to this alternate switching between the working battery and a standby battery. This full utilization of the energy stored in the working battery coupled to the fail-safe protection provided by the standby battery reduces the overall operating expense necessary for maintaining a higher voltage battery powered system.

SUMMARY OF THE INVENTION

This invention relates to a solid-state switching system for use in automatically switching a load from an energy depleted power source to a fully powered standby source and then back to the original power source when and if it increases to a predetermined working voltage level. To accomplish this switching operation, a first switching means is used to couple a working power source to a load while a second switching means is utilized to couple a standby power source to a load. First and second control means coupled to the first and second switching means, respectively, are employed to regulate the condition of the switching means so that when the first control means is actuated, it will cause the first switching means to couple the working power supply to the load. Likewise the actuation of the second control means will cause the second switching means to couple the standby power source to the load. Triggering means, coupled to both first and second control means, is used to regulate the actuation of both control means so that when one is actuated, the other control means will be deactuated. Thus only one power source will be connected to the load at any one time. The triggering means is responsive to the potential of the first power source and when the voltage of the source is above a predetermined level the triggering means will actuate the first control means which in turn will actuate the first switching means thereby connecting the first power source to the load. When the voltage of the first power source decreases below this predetermined level, the triggering means will deactuate the first control means which will deactuate the first switching means and simultaneously the triggering means will actuate the first control means which in turn actuates the second switching means thereby connecting the standby power source to the load. If the first power source increases its potential energy to a voltage level above the predetermined level at which the triggering means is responsive, then all the control and switching means will change state and the first power source will again be connected to the load. The primary power source intended for use with this switching system is the common high voltage battery such as the air cell battery, which has a regenerative characteristic enabling it to increase its voltage level once it is disconnected from a load. The design of the triggering means of this switching system takes advantage of this regenerative effect by switching the load from a standby battery back to the original battery once the voltage level of the battery is increased to a working value. This switching between the first and standby batteries continues until all the usable energy in the first battery is completely dissipated.

A display indicator, suitably incorporated into the switching circuit as hereinafter described, provides a visual indication as to which battery is supplying the energy to the load. A quick visual glance by a maintainer will then immediately apprise him of the condition of the switching system so that if the indicator shows the standby battery supplying the energy to the load, he will know it is time to replace the original working battery.

The object of this invention will be apparent from the following description and claims taken in conjunction with the drawing which shows a switching circuit suitable for implimenting this invention.

In the drawing Darlington stage 20 comprising transistors Q5 and Q7, is connected in series between the load and the working battery. Darlington state 21, comprising transistors Q6 and Q8, is connected in series between the load and the standby battery. Voltage divider R1 and R2 couples the input from the positive terminal of the working battery to base 1 of transistor Q1 which forms part of a triggering circuit with the remaining part comprising Q2 and resistors R4, R5, R6, R8, R9 and R10. R4 and R10 are connected in series between the positive terminal of the standby battery and collectors 2 and 5, respectively. Voltage divider R5 and R9 couples collector 2 of Q1 to base 4 of Q2 thereby keeping the potential of collector 2 higher than base 4. Emitter 3 of Q1 is coupled to emitter 6 of Q2 through voltage divider R6 and R8. When Q1 is "on" or operating in the saturation state, a positive voltage from divider R6 and R8 is fed to emitter 6 of Q2 while simultaneously a positive voltage from voltage divider R5 and R9 is fed to base 4 of Q2. By a proper selection of the resistance values for the components comprising these voltage divider circuits, the potential of base 4 is made less positive than emitter 6 when Q1 is operating in the saturation state. As the potential at base 1 of Q1 decreases from a decrease in the voltage of the working battery, less current will flow through Q1 thereby causing a decrease in the potential at emitter 6 from voltage divider R6 and R8 while simultaneously the potential at base 4 increases since more current will be flowing through voltage divider R5 and R9. When the potential of base 4 is higher than that of emitter 6, Q2 will be driven into saturation, i.e., the "on" condition. This actuation of Q2 causes a larger potential drop across R8 which increased the potential of emitter 3 to a higher level than base 1 thereby driving Q1 out of saturation and into the "off" condition. However, if the potential of base 1 is increased to a predetermined level based on the parameter of the circuit and the resistance values of the voltage dividers, Q1 will again be driven into saturation which in turn will force Q2 "off" as described above.

The output of Q2 from collector 5 is coupled through R7 to base 7 of control transistor Q3 and also through R13 to base 10 of control transistor Q4. Emitter 9 of Q3 is connected to R3 which in turn is coupled to the negative potential of both the working and the standby batteries. Likewise, emitter 11 of Q4 is connected to R14 which in turn is coupled to the negative potential terminals. Collector 8 of Q3 is coupled to Darlington stage 20 which functions as a switching circuit for connecting the working battery to the load. Collector 12 of Q4 is connected to Darlington stage 21 which functions as a switching circuit for connecting the standby battery to the load.

With Q2 off or in the deactuated state, the positive potential from the standby battery is effective applied to the base of both control transistors Q3 and Q4. This positive potential is also applied to Darlington stage 21 while the positive potential of the working battery is applied to Darlington stage 20. Under this set of conditions, base 7 of Q3 is more positive than emitter 9 thereby driving Q3 into saturation which in turn drives Darlington stage 20 into the on state. The actuation of Darlington stage 20 then connects the working battery to the load. At the same time the relatively large potential at base 10 of Q4 is more positive than the potential at emitter 12 but since Q4 is a PNP-type transistor, it is in the off or deactuated state. With Q4 off, Darlington stage 21 is off and the standby battery is isolated from the load.

For the conditions when Q2 is on or actuated, as when Q1 is driven off from a decreased potential applied at base 1, the potential at collector 5 decreases thereby lowering the potential at base 10 to a level lower than that at emitter 12. This drives Q4 into saturation which in turn drives Darlington stage 21 into the on position thereby connecting the standby battery to the load. Simultaneously, the potential at base 7 of Q3 is lowered with respect to emitter 9 which drives Q3 out of saturation. This deactuates Darlington stage 20 thereby isolating the working battery from the load.

Capacitor C is shunted across R2 to effectively limit the oscillation of the trigger circuit Q1 and Q2 which occurs when the voltage at base 1 of Q1 is approximately at the cutoff level. Regeneration of the working battery to a higher voltage level when it is initially disconnected from the load occurs rapidly and could cause oscillation in the triggering circuit thereby driving the Darlington stages into and out of the on condition. The capacitor is added to provide an R-C time delay to the voltage buildup at base 1 of Q1 during regeneration of the working battery and to decrease the oscillation frequency of the triggering circuit. This, in turn, minimizes the accumulated transient time used for driving the Darlington stages from the on condition to the off condition, and vice versa.

Indicator 13, comprising coils L1 and L2 connected to limiting resistors R11 and R12, respectively, is connected into the circuit to provide a visual showing by needle 14 as to which of the batteries is supplying energy to the load. Coil L1 is connected in series with current-limiting resistor R11 and the standby battery. Current biases indicating needle 14 to the left. Coil 12 is connected in series with Q2 and the standby battery which in turn is connected in parallel with Q3 and Q4. The parallel paths of Q3 and Q4 can be disregarded due to the negligible current flow therethrough because of relatively large resistors R7 and R13, respectively. When Q2 is off or deactuated, the current through L1 will greatly exceed the current through L2 and indicating needle 14 will remain biased to the left. This condition will indicate that the working battery is supplying energy to the load. However when Q2 is driven into saturation, the current through L1 will be less than the current through L2 and indicating needle 14 will be biased to the right. This condition will indicate that the standby battery is supplying energy to the load.

To increase flexibility in the switching system of this invention, one or all of the voltage divider circuits can be made variable so that the biasing voltage of Q1 and Q2 can be regulated as desired. For example, by varying the resistance value of either R1 or R2, the potential applied to base 1 of Q1 can be regulated so that the desired potential level at which Q1 is to be driven into or out of saturation can be controlled. Likewise the varying of the resistance value of at least one of the resistors R5, R6, R8 and R9 will alter the biasing of Q2 and thereby control the potential levels at base 4 and emitter 6 which in turn determines the operative condition of Q2.

In addition the Darlington stages can be replaced by any power transistor capable of operating at voltages between 6 and 16 volts and which can be triggered into saturation by control transistors Q3 and Q4.

The overall operational mode of the switching system shown in the drawing can best be explained by an example in which the following value components were employed:

| | |
|---|---|
| Q1, Q2, Q3 | 2N3641 |
| Q4 | 2N3638A |
| Q5, Q6 | 2N3215 |
| Q7, Q8 2N441 | |
| C 2.2uf; 20 V. DC | |
| R1, R2, R3, R4, R14 | 1,000 ohms |
| R5 | 510 ohms |
| R6 | 220 ohms |
| R7, R13 | 10,000 ohms |
| R8 | 750 ohms |
| R9 1,300 ohms | |
| R10, R12 2,000 ohms | |
| R11 | 9,100 ohms |
| Working Battery | 12.5 volts |
| Standby Battery | 12.5 volts |
| Indicator meter | Dual, 2K 0-1 ma. coils |

Initially the voltage applied to base 1 of Q1 from voltage divider R1 and R2 is 5.9 volts which is sufficient to drive Q1 into saturation. This produces a 3.7 volt potential at base 4 and a 4.0 volt potential at emitter 6 of Q2 which keeps Q2 in the off state. Collector 5 of Q2 is at a potential of 11.3 volts which drives NPN-transistor Q3 into saturation while maintaining PNP-transistor Q4 in the off condition. Control transistor Q3 then drives Darlington stage 20 into the on condition which in effect connects the working battery to the load. During this operating period needle 14 of indicator 13 was pivoted to the left. This set of conditions continued until the voltage level at base 1 of Q1 dropped to 4.9 volts. This drove Q1 into the off state while simultaneously driving Q2 into saturation. The potential at collector 5 of Q2 decreased to 4.7 volts driving Q4 into saturation while simultaneously driving Q3 off. The deactuation of Q3 drove Darlington stage 20 off thereby disconnecting the working battery from the load while the actuation of Q4 drove Darlington stage 21 into the on condition which connected the standby battery to the load. The current through coil L2 of indicator 13 increased to bias needle 14 into pivoting to the right to indicate that the standby battery was supplying the energy to the load. This set of conditions continued until the regenerative characteristics of the working battery elevated the potential at base 1 of Q1 to 5.5 volts. This base potential was now higher than the potential at emitter 3 which was at 4.8 volts due to the conductive path of R10, Q2 and R8. Q1 was then driven into saturation which in turn drove Q2 off thereby actuating Q3 and Darlington stage 20. This connected the working battery back to the load where it stayed until the voltage at base 1 decreased to 4.9 and the cycle was repeated. The rapid regenerative surge in the potential of the working battery once it was disconnected from the load was shunted from base 1 from the capacitor C and thereafter the potential at base 1 increased in an R-C-type manner.

What is claimed is:

1. A switching system for switching a load from a first power source to a second power source when the potential energy of the first source decreases to a predetermined level and then switching the load back to the first power source when the potential energy increases above a second predetermined level comprising:
   a. a first switching means connecting the first power source to a load;
   b. a second switching means connecting the second power source to a load;
   c. a first control means for actuating said first switching means to connect said load to the first power source;
   d. a second control means for actuating said second switching means to connect said load to the second power source;
   e. a triggering means for actuating one of said control means while simultaneously deactivating the other of said control means; and
   f. said triggering means being responsive to the potential of said first power supply so as to actuate said first control means whenever the potential of said first power source is above a predetermined level and to actuate said second control means to thereby actuate said second switching means whenever the potential of said first power source is below a predetermined value.

2. The switching device of claim 1 wherein an electrical indicator means is connected across the second power source for indicating which of the power sources is supplying power to the load.

3. The switching system of claim 1 wherein a capacitor shunts the output of the triggering means to minimize oscillations of the triggering means.

4. The switching system of claim 1 wherein said triggering means comprises two transistors, the collector output of the first being coupled by a first resistive voltage divider means to the base input of the second and the emitter output of the first being coupled by a second resistive voltage divider means to the emitter of the second.

5. The switching system of claim 4 wherein the resistive value of at least one of the components of the voltage divider means is variable so that the potential level necessary to change the state of the triggering means can be regulated.

6. The switching system of claim 1 wherein said first and second switching means are Darlington stages.

7. The switching system of claim 1 wherein the output from the triggering means is connected to the input of both control means and wherein one control means comprises an NPN-transistor circuit and the other control means comprises a PNP-transistor circuit.

8. The switching system of claim 1 wherein said first power source is coupled to the input of the triggering means through a resistive voltage divider.

9. The switching system of claim 8 wherein at least one of the resistive components comprising said voltage divider is variable.

10. The switching system of claim 1 wherein said first and second power sources are batteries.

* * * * *

UNITED STATES PATENT OFFICE
CERTIFICATE OF CORRECTION

Patent No. 3,631,257      Issue Date December 28, 1971

Inventor(s) Byron C. Behr et al.

It is certified that error appears in the above-identified patent and that said Letters Patent are hereby corrected as shown below:

It is certified that errors appear in the above-identified patent and that said Letters Patent are hereby corrected as shown below:

In the specifications:

Page 1, line 2, after "Stamford" add -- Conn. --.
Page 1, line 3, delete "both of Conn." and add in its place -- N.Y. --
Col. 1, line 35, "using" should be -- usable --.
Col. 2, line 31, "first " should be -- second --.

Col. 3, lines 36, 48, 49, 73 and
Col. 4, lines 9,56,59,64, 67, 68 and Col. 5, line 5 "off" should be -- "off" --
Col. 3, line 37, "effective" should be -- effectively --.
Col. 3, lines 43, 51, 56, 67, 73 and
Col. 4, lines 59, 70 "on" should be -- "on" --.
Col. 4, line 4, after "Current" add - continuously flows through L1 which
Col. 4, line 5, "12" should be -- L2 --.
Col. 5, line 10, after "1" delete "from" and add -- by --.

In the Claims:

Claim 1, line 20, "supply" should be -- source --.
Claim 1, line 21 after "means" add -- to thereby actuate said first switching means --.
Claim 2, line 1 "device" should be -- system --.
Claim 3, line 2 "output" should be -- input --.

Signed and sealed this 27th day of February 1973.

(SEAL)
Attest:

EDWARD M. FLETCHER, JR.
Attesting Officer

ROBERT GOTTSCHALK
Commissioner of Patents